(12) United States Patent
Takeshita et al.

(10) Patent No.: US 10,412,182 B2
(45) Date of Patent: Sep. 10, 2019

(54) COMMUNICATION SPEED ESTIMATION APPARATUS, COMMUNICATION SPEED ESTIMATION METHOD, AND PROGRAM

(71) Applicant: NIPPON TELEGRAPH AND TELEPHONE CORPORATION, Chiyoda-ku (JP)

(72) Inventors: Kei Takeshita, Musashino (JP); Hiroshi Yamamoto, Musashino (JP); Kazumichi Sato, Musashino (JP); Taichi Kawano, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 140 days.

(21) Appl. No.: 15/536,361

(22) PCT Filed: Dec. 17, 2015

(86) PCT No.: PCT/JP2015/085405
§ 371 (c)(1),
(2) Date: Jun. 15, 2017

(87) PCT Pub. No.: WO2016/098866
PCT Pub. Date: Jun. 23, 2016

(65) Prior Publication Data
US 2017/0374167 A1    Dec. 28, 2017

(30) Foreign Application Priority Data
Dec. 18, 2014  (JP) .................................. 2014-256412

(51) Int. Cl.
*G06F 13/00* (2006.01)
*H04L 29/08* (2006.01)
*H04W 72/04* (2009.01)

(52) U.S. Cl.
CPC ............ *H04L 67/22* (2013.01); *H04L 67/322* (2013.01); *H04W 72/0446* (2013.01)

(58) Field of Classification Search
CPC ... H04L 67/22; H04L 67/322; H04W 72/0446
(Continued)

(56) References Cited

U.S. PATENT DOCUMENTS

| 5,913,041 | A | 6/1999 | Ramanathan et al. |
| 8,417,811 | B1 * | 4/2013 | Jenkins ............... G06F 11/3452 709/224 |

(Continued)

FOREIGN PATENT DOCUMENTS

| JP | 2010-166137 A | 7/2010 |
| JP | 2013-200632 A | 10/2013 |

OTHER PUBLICATIONS

International Search Report dated Feb. 2, 2016 in PCT/JP2015/085405.
(Continued)

*Primary Examiner* — Kenneth R Coulter
(74) *Attorney, Agent, or Firm* — Oblon, McClelland, Maier & Neustadt, L.L.P.

(57) ABSTRACT

A communication speed estimation apparatus configured: to generate communication log information representing history of communication executed by a user, and store the communication log information in a communication history information storage unit; to calculate, based on the stored communication log information, throughput result information for each of a server, a network, and a user terminal that were used for the communication for each time slot, and store the calculated throughput result information in a quality information storage unit; and, when the user performs new communication, in advance, to read out corresponding throughput result information from the quality information
(Continued)

storage unit based on at least one of a terminal, a server, and a network that the user intends to use, and a time slot including a time when the user intends to perform communication, and to estimate a communication speed in the new communication based on the read-out throughput result information.

7 Claims, 7 Drawing Sheets

(58) Field of Classification Search
USPC .................................................. 709/224, 223
See application file for complete search history.

(56) References Cited

U.S. PATENT DOCUMENTS

| | | | | |
|---|---|---|---|---|
| 9,338,068 B2* | 5/2016 | Patel | ..................... | H04L 41/147 |
| 9,450,839 B2* | 9/2016 | Patel | ..................... | H04L 41/147 |
| 2014/0136679 A1* | 5/2014 | Patel | ..................... | H04L 41/147 |
| | | | | 709/224 |
| 2014/0136687 A1* | 5/2014 | Patel | ..................... | H04L 41/147 |
| | | | | 709/224 |
| 2018/0027130 A1* | 1/2018 | Yermakov | ............. | H04M 15/58 |
| | | | | 455/405 |

OTHER PUBLICATIONS

Hirabayashi Mitsuhiro, "Next Generation Moving Picture Distribution Technique "MPEG-DASH" Technique Outline and Standardization Related Technique Trend" The Journal of Image Information and Television Engineers: Image information medium vol. 67, No. 2, Feb. 1, 2013, pp. 109-115 (with partial English translation).

Akimichi Ogawa, "Akamai, Unknown giant of the Internet", Chapter 4, Kadokawa, ISBN: 9784040800172, Aug. 11, 2014, 33 Pages (with partial English translation).

* cited by examiner

FIG.5

| DATE | HOLIDAY/WEEKDAY FLAG |
|---|---|
| 2014/7/1 | 1 |
| 2014/7/2 | 1 |
| 2014/7/3 | 1 |
| 2014/7/4 | 1 |
| 2014/7/5 | 2 |
| 2014/7/6 | 2 |

FIG.6

| IP ADDRESS | PLMN NUMBER | NETWORK TYPE | BASE STATION ID | NW_ID |
|---|---|---|---|---|
| xxx.xxx.xxx.xxx | | | | 1 |
| yyy.yyy.yyy.yyy | | | | 2 |
| | 44010 | 3G | 102381293 | 3 |
| | | 3G | 21023847 | 4 |
| | 44020 | LTE | 12039484 | 5 |
| | 44050 | 3G | 12398475 | 6 |

FIG.7A

| TIME SLOT | NW_ID | THROUGHPUT AVERAGE VALUE | THROUGHPUT DEVIATION VALUE |
|---|---|---|---|
| WEEKDAY 1~7 O'CLOCK | 1 | XXX | yyy |
| WEEKDAY 7~9 O'CLOCK | 1 | XXX | yyy |
| WEEKDAY 10~12 O'CLOCK | 1 | XXX | yyy |
| WEEKDAY 12~13 O'CLOCK | 1 | XXX | yyy |
| WEEKDAY 13~18 O'CLOCK | 1 | XXX | yyy |
| WEEKDAY 18~25 O'CLOCK | 1 | XXX | yyy |
| WEEKDAY 1~7 O'CLOCK | 2 | XXX | yyy |

FIG.7B

| TIME SLOT | SERVER ID | THROUGHPUT AVERAGE VALUE | THROUGHPUT DEVIATION VALUE |
|---|---|---|---|
| WEEKDAY 1~7 O'CLOCK | 1 | XXX | yyy |
| WEEKDAY 7~9 O'CLOCK | 1 | XXX | yyy |
| WEEKDAY 10~12 O'CLOCK | 1 | XXX | yyy |
| WEEKDAY 12~13 O'CLOCK | 1 | XXX | yyy |
| WEEKDAY 13~18 O'CLOCK | 1 | XXX | yyy |
| WEEKDAY 18~25 O'CLOCK | 1 | XXX | yyy |
| WEEKDAY 1~7 O'CLOCK | 2 | XXX | yyy |

COMMUNICATION SPEED ESTIMATION APPARATUS, COMMUNICATION SPEED ESTIMATION METHOD, AND PROGRAM

TECHNICAL FIELD

The present invention relates to a communication speed estimation apparatus, a communication speed estimation method and a program for estimating a communication speed of a network when using the network.

BACKGROUND ART

In recent years, various services are being provided by utilizing a network. In addition, due to popularization of mobile communications and the like, users of network services are becoming to perform accessing from network environments of various communication speeds. In such a situation, since service providers cannot distinguish users by communication speeds, in many cases, service providers provide services by using a band that allows many users to use without problems. However, in this case, a problem arises that a user who uses a broadband network environment cannot receive services with quality that should be originally usable. Also, for users who utilize a narrowband network environment, there arises a problem that quality deterioration will occur when using the environment.

Therefore, with respect to voice/video communication services, which are services that are particularly susceptible to the network quality, efforts are being made to dynamically change provision quality of the service according to quality indicators that can be measured by users, such as occurrence of stop of reproduction, or occurrence of break of voice or the like while the services are being provided. This is a control scheme seen in MPEG-DASH and the like in recent years (refer to reference 1, for example).

In addition, like a CDN (Contents Delivery Network), a technique is also widespread for selecting, in advance, a server closest to a user's IP address and the like so as to select a server that the user can use comfortably as much as possible (refer to reference 2 for example).

RELATED ART DOCUMENT

Non Patent Document

[NON PATENT DOCUMENT 1] Hirabayashi Mitsuhiro, next generation moving picture distribution technique "MPEG-DASH" technique outline and standardization•related technique trend, The Journal of Image Information and Television Engineers: Image information medium 67(2), 109-115, Feb. 1, 2013

[NON PATENT DOCUMENT 2]A. Ogawa, "Akamai, Unknown giant of the Internet", Chapter 4, KADOKAWA

SUMMARY OF THE INVENTION

Problem to be Solved by the Invention

However, in the control method defined in MPEG-DASH and the like, since service providing quality is changed according to a quality indicator in the user side after start of providing the service, the before-mentioned problem remains unsolved for a period after start of providing the service.

Also, much of the bottleneck in the current mobile network is in the network. Therefore, even if a technique of selecting a sever closest to the user terminal is selected, it is difficult to avoid quality deterioration caused by the network. The present invention is contrived focusing on the above-mentioned circumstances, and an object of the present invention is to provide a technique to make it possible to estimate a usable communication speed in advance.

Means for Solving the Problem

For achieving the above object, according to an embodiment of the present invention, there is provided a communication speed estimation apparatus including:

first means configured to generate communication log information representing a history of communication executed by a user, and store the communication log information in a communication history information storage unit;

second means configured to calculate, based on the stored communication log information, throughput result information for each of a server, a network and a user terminal that were used for the communication for each time slot, and store the calculated throughput result information in a quality information storage unit, and third means configured, when the user performs new communication, in advance, to read out corresponding throughput result information from the quality information storage unit based on at least one of a terminal, a server and a network that the user intends to use, and a time slot including a time when the user intends to perform communication, and to estimate a communication speed in the new communication based on the read-out throughput result information.

Effect of the Present Invention

According to an embodiment of the present invention, a technique to make it possible to estimate a usable communication speed in advance is provided.

BRIEF DESCRIPTION OF THE DRAWINGS

FIG. 5 is a diagram showing an example of stored information of a calendar information database included in the communication speed estimation apparatus shown in FIG. 1;

FIG. 6 is a diagram showing an example of stored information of a network database included in the communication speed estimation apparatus shown in FIG. 1;

FIG. 7A is a diagram showing an example of stored information of a quality database included in the communication speed estimation apparatus shown in FIG. 1, and showing information representing network quality;

FIG. 7B is a diagram showing an example of stored information of a quality database included in the communication speed estimation apparatus shown in FIG. 1, and showing information representing server quality;

EMBODIMENTS FOR CARRYING OUT THE INVENTION

Figure 1:
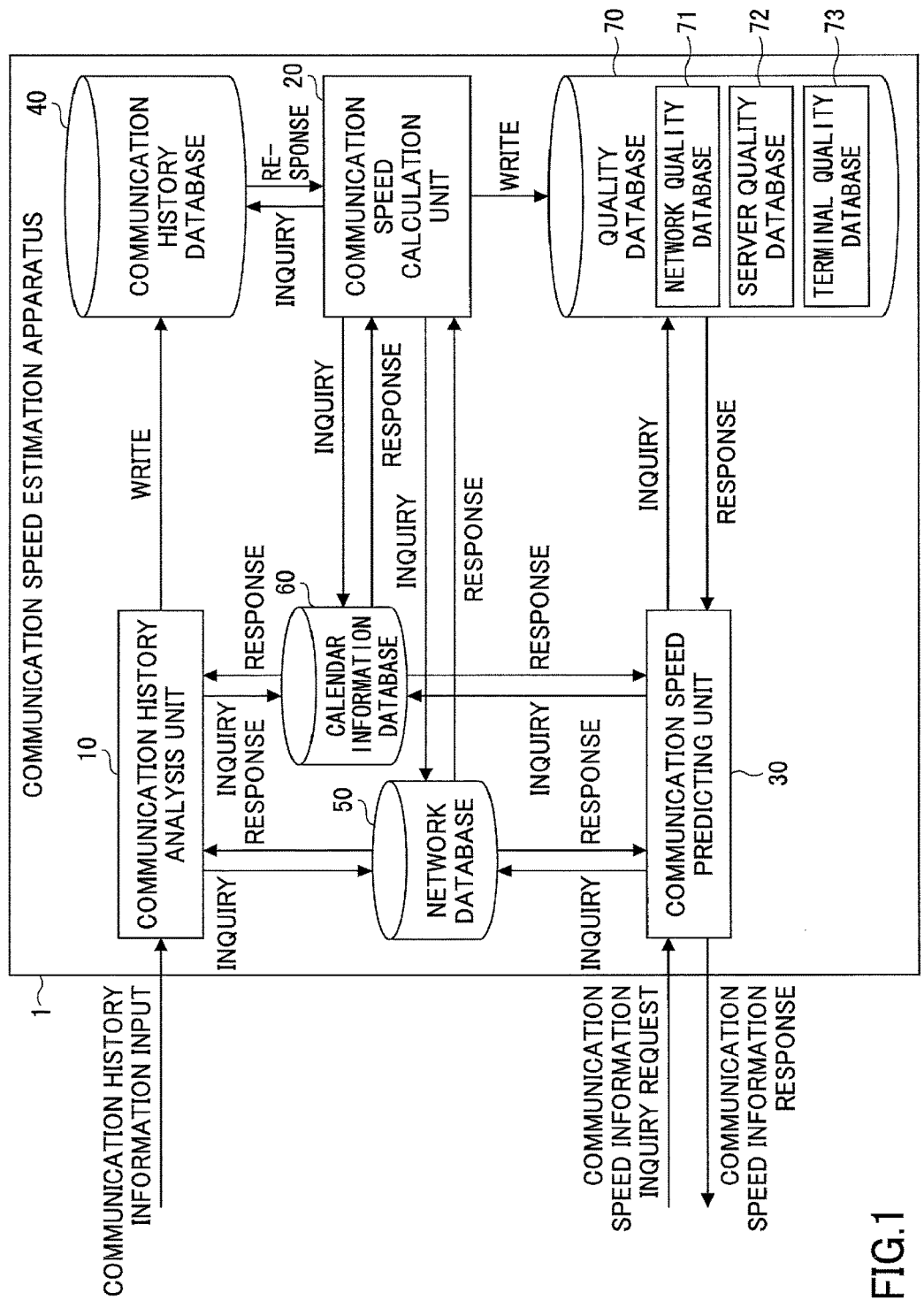
FIG. 1 is a block diagram showing a configuration of a communication speed estimation apparatus in an embodiment of the present invention.

In the following, an embodiment related to the present invention is described with reference to figures.

(Outline)

First, an outline of an embodiment of the present invention is described.

In a first aspect of the present invention, each time when communication is performed, the communication speed estimation apparatus stores, as communication log information, in a communication history information storage unit, information representing a communication history, that is, for example, information identifying a user terminal, a server, and a network that were used for the communication, and information representing a time slot including a communication time, and in addition, calculates, based on the stored communication log information, throughput result information for each of the user terminal, the server, and the network for each time slot of a predetermined granularity, and stores the calculated throughput result information in a quality information storage unit. Then, before the user starts new communication, the communication speed estimation apparatus searches for throughput result information, from the quality information storage unit, of communications performed in the same past time slot by using the user terminal, the server and the network used for the communication, so as to estimate a communication speed in the new communication based on the throughput result information.

In an second aspect of the present invention, in the case where the throughput result information is calculated, when a plurality of pieces of communication log information are stored in the communication history information storage unit, the communication speed estimation apparatus aggregates communication log information of communications in which a same server, a same network or a same user terminal was used to calculate the throughput result information for each of the server, the network, and the user terminal for each time slot based on the aggregated communication log information.

In a third aspect of the present invention, when calculating the throughput result information, the communication speed estimation apparatus calculates a throughput value for each of the server, the network, and the user terminal for each time slot, for each of the integrated pieces of communication log information, and calculates an average of throughput values included in an predetermined upper range in each calculated throughput value, so as to regard the calculated throughput average value as the throughout result information.

In a fourth aspect of the present invention, when estimating the communication speed, the communication speed estimation apparatus reads out, from the quality information storage unit, throughput result information corresponding to a time slot that includes a time when communication is intended to be performed, and corresponding to each of a terminal, a server, and a network that the user uses, selects one in which the throughput value is the smallest from among the read-out pieces of throughput result information, and estimates a communication speed in the new communication based on the selected throughput result information.

In a fifth aspect of the present invention, when estimating the throughput result information, the communication speed estimation apparatus calculates at least one of a ratio of values included in upper and lower ranges, each of which is predetermined, of each throughput value calculated for each of the server, the network, and the user terminal for each time slot, and a value representing dispersion of each calculated throughput value. Then, when estimating a communication speed, the communication speed estimation apparatus estimates a communication speed in the new communication based on at least one of the calculated throughput average value, the calculated ratio of throughput values included in the upper and lower ranges each of which is predetermined, and the calculated value representing the degree of dispersion of the throughput value.

In the following, each of the above-mentioned aspects is described in detail. That is, in an embodiment of the present invention, first, focusing on characteristics that the number of accesses to the network constantly changes according to time ranges, a communication speed is estimated by delimiting time using time slots such as date and time, day of week or the like.

The above-mentioned characteristics are described in the following document. That is, in Ministry of Internal Affairs and Communications "Grasping of Total Traffic on the Internet in our country", P5, Ministry of Internal Affairs and Communications, Telecommunications Bureau, Telecommunications Business Department, Data communication Division, Mar. 14, 2014, internet: www.soumu.go.jp, hourly variation of internet traffic for each day of week is described. According to this document, by distinguishing between weekdays and holidays, for example, at the same time of weekdays, there is a tendency in that a similar traffic volume is obtained.

Also, TCP (Transmission Control Protocol) that is a protocol widely used in the Internet is a mechanism that fairly utilizes a band. For this reason, there is a tendency in that users sharing the same link always become a similar throughput. The present invention also utilizes this point for estimation of a communication speed.

The reason why throughput result information is used for estimation of a communication speed is that there is a network property that end-to-end throughput in communication is rate-limited by one bottleneck point. For example, in the case where a user terminal has processing capability of 300 Mbps, a server has processing capability of 100 Mbps, and a network has processing capability of 5 Mbps, the throughput of the route becomes 5 Mbps.

However, as past communication log information, there are very few communication logs of a set in which each piece of identification information of date and time, server, network and user terminal matches. Therefore, it is difficult to estimate end-to-end communication speed simply by searching a communication history information storage unit. For example, when there are 200 servers, 100 thousands types of networks (set by assuming the number of base stations), 10 types of user terminals, and 24 types of time slots, the number of combinations becomes 1 billion, so that necessary amount of communication log information becomes a size difficult to collect.

Therefore, in an embodiment of the present invention, throughput result information is calculated for each of the server, the network and the user terminal for each time slot, so that a communication speed is estimated based on the throughput result information.

As a method for calculating a throughput for each of the server, the network, and the user terminal, as described in the second aspect, pieces of communication log information of communications in which the same server, network or user terminal was used are integrated, so that throughput result information can be calculated for each of the server, the network and the user terminal for each time slot based on the integrated communication log information. That is, in communications that were performed in the past, for communications in which the server, the network or the user terminal is the same, common throughput result information is calculated and stored respectively.

By doing so, compared to the case where throughput result information is calculated and stored for each of the server, the network and the user terminal for each of all communications, the number of pieces of throughput result information to store can be largely reduced. Accordingly, it becomes possible to reduce capacity of the storage unit, and to shorten the search processing speed for throughput result information.

Further, as described in the third aspect, an average value of throughput values included in a predetermined upper range from a plurality of throughput values calculated for each of a same server, a same network and a same user terminal in a same time slot is calculated, so that the throughput average value is stored as throughput result information. That is, a method is adopted to obtain an upper quantile value for throughputs of communication log information of communication that uses the server, the network and the user terminal.

By using this method, a following effect can be obtained. That is, for example, communication log information using a server is information representing that the throughput was obtained when the server was used. Therefore, there is a possibility in that rate is limited due to other elements such as the network or the user terminal. Thus, by using the quantile value of upper values removing lower values in which there is such a possibility, even when there is dispersion in a plurality of communications performed under the same condition, more reliable estimation of a communication speed becomes possible by decreasing the effect of the dispersion.

In addition, as described in the fourth aspect, when estimating a communication speed, one in which the value is the smallest may be selected from among the pieces of throughput result information calculated for each of the user terminal, the server and the network to estimate the communication speed. By doing so, it becomes possible to properly estimate an end-to-end communication speed according to a property of network that end-to-end throughput in communication is rate-limited by one bottleneck.

In addition, as described in the fifth aspect, when calculating throughput result information, not only the average value, but also a dispersion value, or a ratio of values included in upper or lower predetermined range (upper percent value or lower present value) may be obtained, so as to estimate a communication speed of new communication by referring to the dispersion value, or upper or lower percent value in addition to the average value.

Generally, since throughput largely varies in communication, there is a section that falls below an average value when seen instantaneously. Therefore, there may be a case where accurate estimation of a communication speed cannot be performed only by the average value for a service that always requires a communication speed equal to or greater than a constant value, that is, for example, streaming distribution of voice and video.

However, as described above, by performing estimation of a communication speed by referring to not only the average value, but also each of the upper and lower ratios, and the dispersion value as the throughput result information, more accurate estimation becomes possible.

[An Embodiment]
(Configuration)

FIG. 1 is a block diagram showing a configuration of a communication speed estimation apparatus in an embodiment of the present invention.

The communication speed estimation apparatus 1 is provided with a processing unit including a CPU (Central Processing Unit), and a storage unit using a non-volatile memory by which writing/reading is available as needed. As storage units in the embodiment, the storage unit is provided with a communication history database 40, a network database 50, a calendar information database 60 and a quality database 70.

The communication history database 40 is used for storing communication log information generated for each communication by the after-mentioned communication history analysis unit 10. The calendar information database 60 stores, being associated with date, holiday/week day frag for identifying whether the date is a weekday or a holiday. FIG. 5 shows an example of the storing result.

The network database 50 stores, being associated with network ID (NW_ID), information for identifying a network. More specifically, for a fixed circuit, an IP address that is defined for each internet service provider (Internet Service Provider: IPS) is stored, and, for a mobile telephone circuit (Public Land Mobile Network: PLMN), a base station ID is stored together with a mobile telephone number (PLMN number) and information representing a network type. FIG. 6 shows an example of these.

The quality database 70 includes a network quality database 71, a server quality database 72, and a terminal quality database 73. The network quality database 71 stores, for each time slot of a predetermined granularity, for example, every one hour, identification information (NWID) of a network used for communication performed in the time slot, a throughput average value and a throughput deviation value calculated by the after-mentioned communication speed calculation unit 20. FIG. 7A shows an example of the storing result. Like the network quality database 71, the server quality database 72 stores, every one hour, identification information (server ID) of a server used for communication performed in the time slot, a throughput average value and a throughput deviation value calculated by the after-mentioned communication speed calculation unit 20. FIG. 7B shows an example of the storing result. The terminal quality database 73 stores, every one hour, identification information (user ID) of a user terminal used for communication performed in the time slot, a throughput average value and a throughput deviation value calculated by the after-mentioned communication speed calculation unit 20. Also, as for the terminal quality database 73, data is stored by a format similar to that of the databases shown in FIG. 7A and FIG. 7B.

In addition, the processing unit includes as control function units of the present embodiment, a communication history analysis unit 10, a communication speed calculation unit 20, and a communication speed predicting unit 30. Each of these control function units is realized by causing the CPU to execute a program stored in a program memory which is not shown in the figure. Also, each of the communication history analysis unit 10, the communication speed calculation unit 20 and the communication speed predicting unit 30 may be a hardware circuit having a corresponding process logic.

Figure 2:
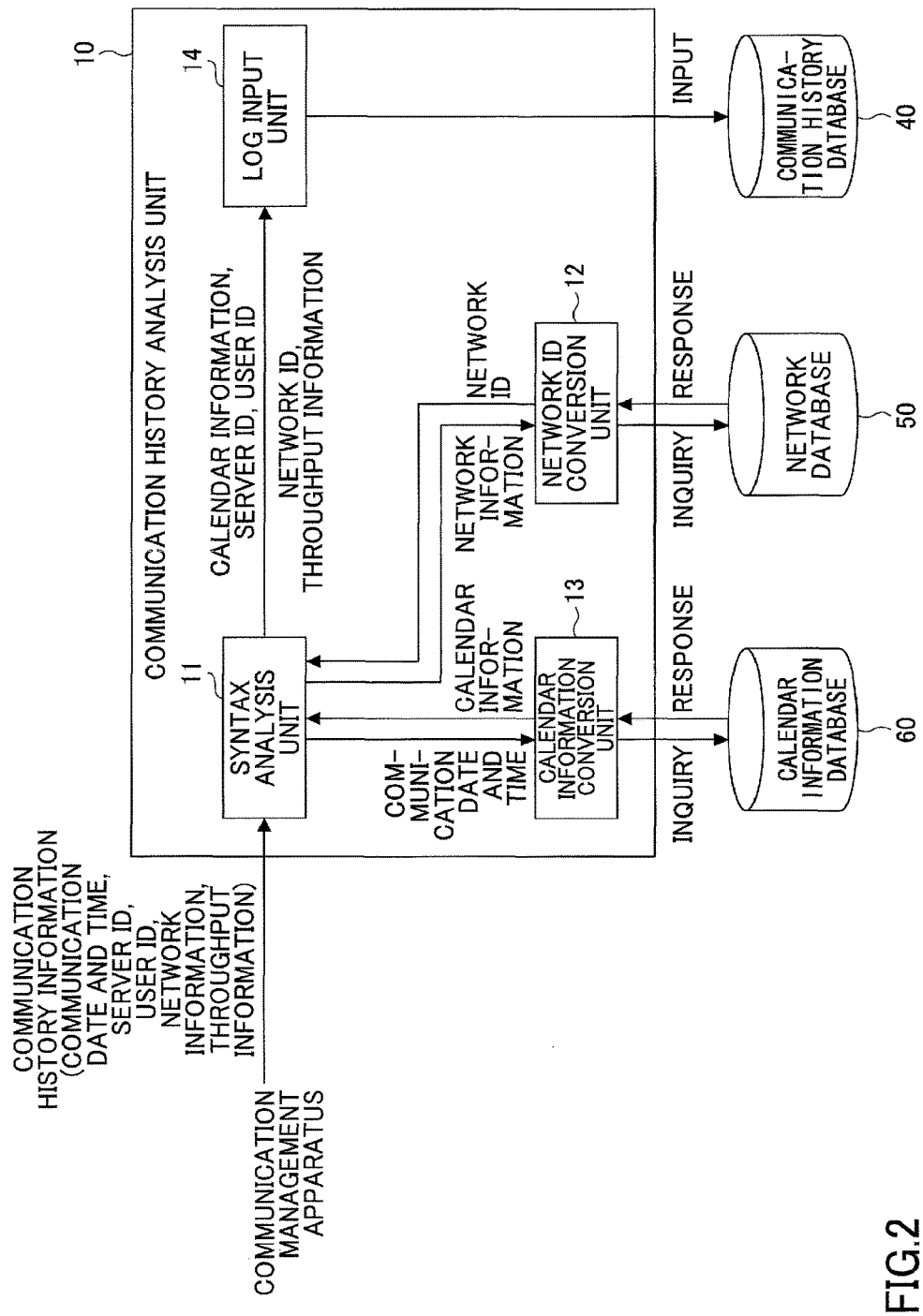
FIG. 2 is a block diagram showing a configuration of a communication history analysis unit included in the communication speed estimation apparatus shown in FIG. 1.

The communication history analysis unit 10 is configured, each time when communication is performed, to generate communication log information based on the communication history and stores it in the communication history database 40, and as shown in FIG. 2, it includes a syntax analysis unit 11, a network ID conversion unit 12, a calendar information conversion unit 13 and a log input unit 14.

Each time when communication is performed, the syntax analysis unit 11 receives communication history information of the communication from a communication management apparatus. The communication history information includes a communication date and time, a server ID, a user ID, network information and throughput information. The syntax analysis unit 11 extracts necessary parameters from the communication history information according to the format of the communication log information.

The network ID conversion unit 12 converts network information included in the communication history information into a network ID according to a granularity of the network used for estimation of a communication speed by referring to the network database 50.

The calendar information conversion unit 13 refers to the calendar information database 60 to determine whether the communication date and time included in the communication history information is a holiday or a weekday, and converts the communication date and time into a time slot according to a granularity of time used for estimation of the communication speed.

The log input unit 14 stores parameters extracted by the syntax analysis unit 11, that is, a server ID, a user ID and throughput information, a network ID converted by the network ID conversion unit 12, and calendar information obtained by the calendar information conversion unit 13 in the communication history database 40 by associating them with each other.

Figure 3:
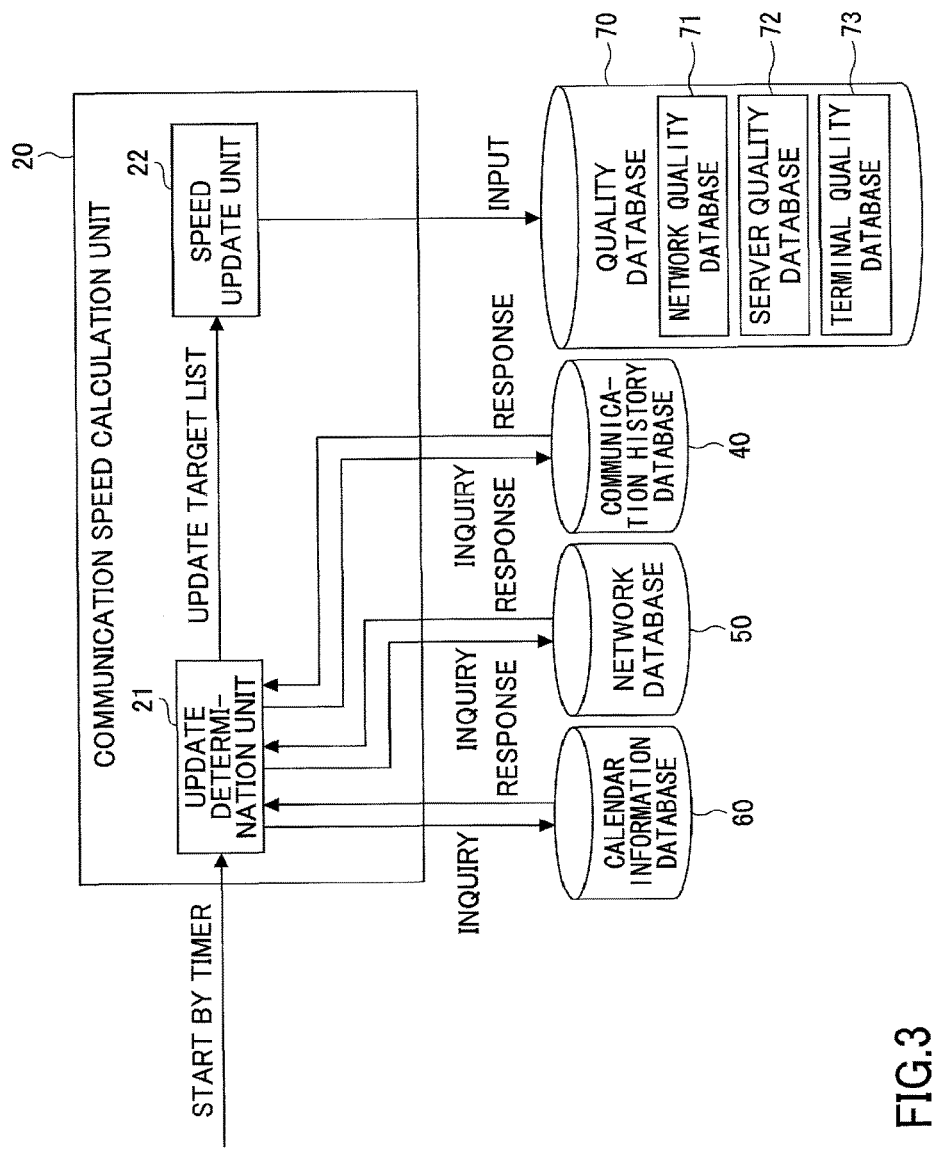
FIG. 3 is a block diagram showing a configuration of a communication speed calculation unit included in the communication speed estimation apparatus shown in FIG. 1.

The communication speed calculation unit 20 is configured to periodically calculate a throughput for each of the server, the network and the user terminal for each time slot based on communication log information stored in the communication history database 40, and it includes an update determination unit 21 and a speed update unit 22 as shown in FIG. 3.

Each time when a start request is periodically input by a timer not shown in the figure, the update determination unit 21 searches the network database 50, the calendar information database 60 and the communication history database 40 so as to determine whether new communication log information is added or not. When the new communication log information is added, the update determination unit 21 provides the speed update unit 22 with the communication log information.

The speed update unit 22 calculates each of the throughput average value and the throughput deviation value for each of the server, the network and the user terminal for each time slot based on communication log information provided from the update determination unit 21. Then, the speed update unit 22 stores the throughput average value and the throughput deviation value calculated for each of the server, the network and the user terminal in the network quality database 71, the server quality database 72 and the terminal quality database 73 of the quality database 70 respectively.

Figure 4:
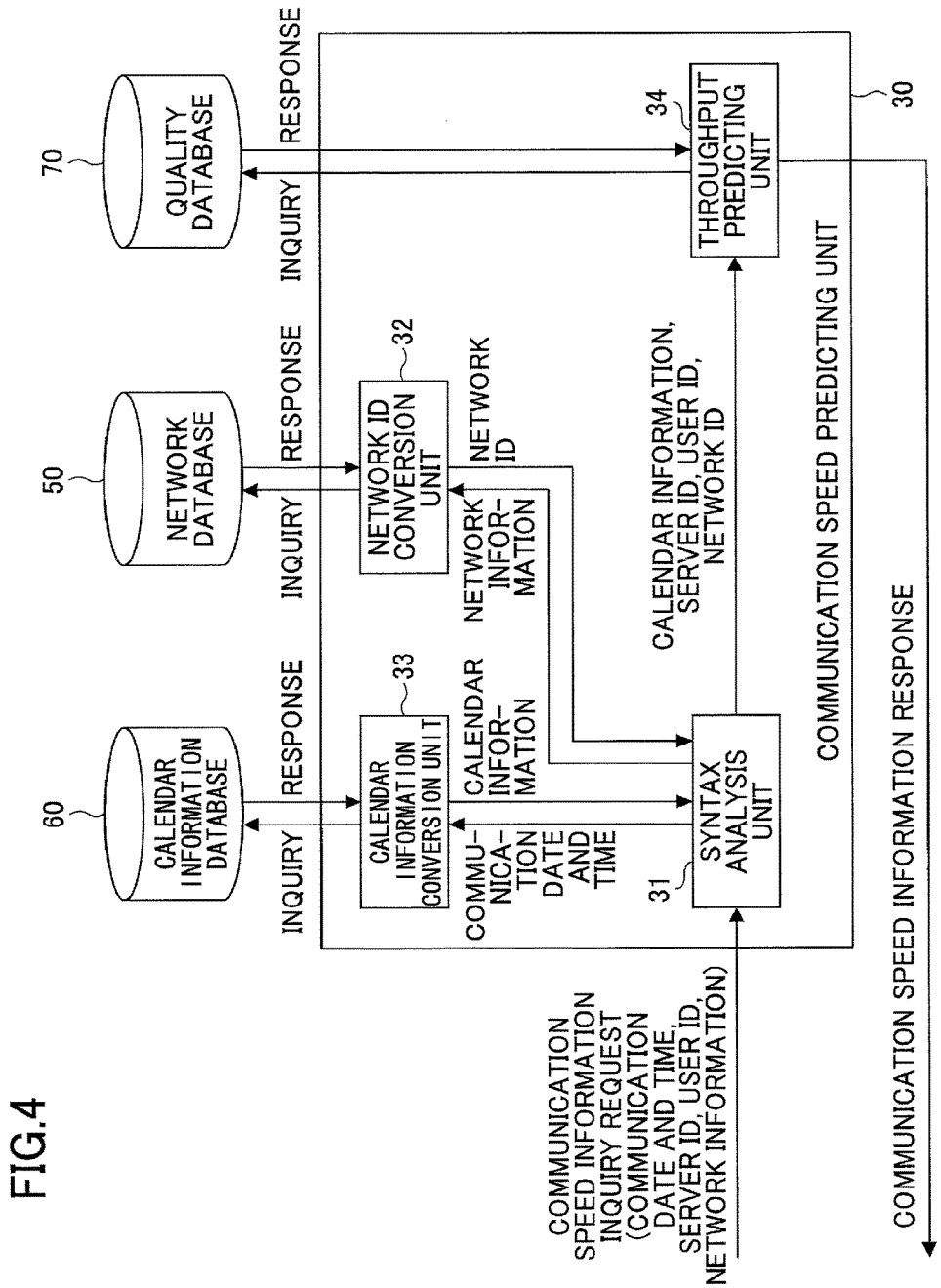
FIG. 4 is a block diagram showing a configuration of a communication speed predicting unit included in the communication speed estimation apparatus shown in FIG. 1.

The communication speed predicting unit 30 has a function configured, when an inquiry request of communication speed information is input before new communication, to respond communication speed information in the new communication, and it includes a syntax analysis unit 31, a network ID conversion unit 32, a calendar information conversion unit 33 and a throughput predicting unit 34 as shown in FIG. 4.

Like the before-mentioned syntax analysis unit 11 of the communication history analysis unit 10, the syntax analysis unit 31 extracts a server ID and a user ID from the communication speed inquiry request. Like the network ID conversion unit 12 of the communication history analysis unit 10, the network ID conversion unit 32 refers to the network database 50 so as to convert network information included in the communication speed information inquiry request into a network ID according to a granularity of the network used for estimation of a communication speed.

Like the calendar information conversion unit 13 of the communication history analysis unit 10, the calendar information conversion unit 33 refers to the calendar information database 60 so as to determine whether the communication data and time included in the communication speed information inquiry request is a holiday or a weekday, and converts the communication date and time into a time slot according to a granularity of time used for estimation of a communication speed.

The throughput predicting unit 34 reads out, from the quality database 70, throughput result information, that is, a throughput average value and a throughput deviation value for each of the server, the network and the user terminal in the same time slot, based on the server ID and the user ID extracted by the syntax analysis unit 31, the network ID converted by the network ID conversion unit 32, and the calendar information obtained by the calendar information conversion unit 33. Then, the throughput predicting unit 34 predicts a communication speed of the new communication based on each piece of the read-out throughput information, and returns the predicted communication speed to a request source. The request source is, for example, a user terminal, a server that provides a content distribution service, and the like.

As described before, the communication speed estimation apparatus 1 may be realized by causing a computer including a CPU and a memory to execute a program, or may be realized by using a hardware circuit having a process logic corresponding to each function unit.

Figure 8:
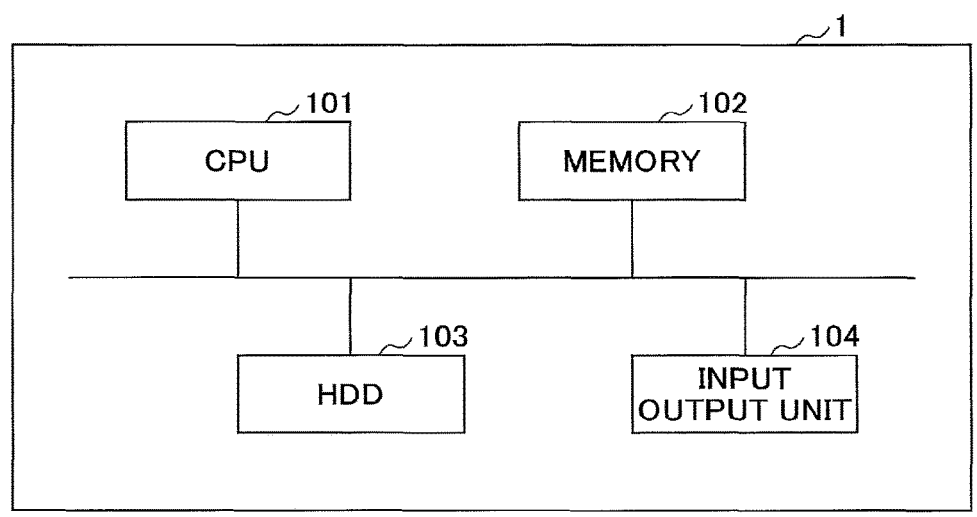
FIG. 8 is a diagram showing a hardware configuration example of the communication speed estimation apparatus.

FIG. 8 shows an example of a hardware configuration when the communication speed estimation apparatus 1 is realized by a computer. As shown in FIG. 8, the communication speed estimation apparatus 1 includes a CPU 101, a memory 102, a HDD (hard disc drive) 103, and an input/output unit 104. Programs corresponding to the communication history analysis unit 10, the communication speed calculation unit 20 and the communication speed predicting unit 30 are stored in the memory or the HDD 103. The CPU 101 reads out the programs and executes them so as to perform processing of the communication history analysis unit 10, the communication speed calculation unit 20 and the communication speed predicting unit 30. Also, each database is stored in the memory 102 or the HDD 103, so that, according to the programs, the CPU 101 accesses the database to read/write data. Also, the input/output unit 104 performs input/output of data with an external part.

(Operation)

Next, operation of the apparatus that is configured as described above is described.

(1) Storing of Communication Log Information

When communication is performed so that communication history information of the communication is input from the communication management apparatus, first, syntax analysis processing on the communication history information is performed by the syntax analysis unit 11 of the communication history analysis unit 10. Accordingly, a server ID, a user ID and throughput information that are parameters necessary for generating communication log information are extracted in conformity to a format of the communication log information. Note that the throughput information in the communication history information input from the communication management apparatus is, for example, a throughput that was measured by a user terminal when the user terminal downloaded contents from a server. Also, the user ID and the server ID in the communication history information correspond to the user terminal and the server. Note that the throughput is a data transfer amount per a unit time, and is an example of a network quality. As the network quality, other indicators may be used instead of the throughput.

Also, at the same time, the network ID conversion unit 12 performs processing to refer to the network database 50 so as to convert the network information included in the communication history information into a network ID according to a granularity of a network used for estimation of a communication speed. For example, as for a fixed circuit, the granularity is ISP unit, so that the network information is converted to an IP address that is issued for each ISP. As to the mobile telephone circuit, the granularity is base station unit, so that a base station ID included in the network information is output as it is without conversion.

Further, the calendar information conversion unit 13 refers to the calendar information database 60 so as to determine whether the communication date and time included in the communication history information is a holiday or a weekday. In addition to that, according to a predetermined granularity of time, for example, the communication date and time is converted to a time slot of one hour unit.

Then, the server ID, the user ID and the throughput information extracted by the syntax analysis unit 11, the network ID converted by the network ID conversion unit 12, and the calendar information output from the calendar information conversion unit 13 are mutually associated by the log input unit 14, and are stored in the communication history database 40 as communication log information.

After that, in the same way, each time when communication history information is input, the communication history analysis unit 10 performs the above-mentioned processing, so that communication log information is generated and stored in the communication history database 40.

(2) Calculation of Throughput Result Information

Each time when a start request is periodically input by a timer, the communication speed calculation unit 20 calculates a throughput for each of the server, the network and the user terminal for each time slot based on the communication log information stored in the communication history database 40. That is, first, the update determination unit 21 searches each of the network database 50, the calendar information database 60 and the communication history database 40 to determine whether new communication log information is added or not. Then, when the new communication log information has been added, the communication log information is provided to the speed update unit 22 as an update target list.

Next, the speed update unit 22 calculates a throughput average value and a throughput deviation value for each of the server, the network and the user terminal for each time slot based on the update target list including the communication log information provided from the update determination unit 21.

For example, a throughput $TPS_j(t)$ of a server j at a date and time t can be obtained by extracting only data of users who used the server j at a time slot including the date and time t from target communication log information, and calculating an average of upper x % values of the throughput average values. This is described by an equation as the following equation (1). Note that, for example, in a case where a user A used the server j 10 times (when there are 10 pieces of throughput data) in the time slot, the "throughput average value" here is a value obtained by adding the pieces of throughput data and dividing it by 10. Such a throughput average value is obtained for each user that used the server j.

$$TPS_j(t) = ave(rep_x(L_m|SI_m=j)) \quad (1)$$

Here, the function ave is a function for obtaining an average value, the function $rep_x$ is a function for extracting only values (percent values) corresponding to a ratio of a predetermined upper range x from among given values. Also, "$L_m|SI_m=j$" indicates log information that used the server j in the communication log information. The values obtained by the above equation correspond to "throughput average value" in FIG. 7B. The "throughput deviation value" is calculated by calculating a square root of deviation of log information that used the server j as a value indicating to what extent throughputs are dispersed when using the server j. As for the network and the user terminal, throughputs $TPN_k(t)$ and $TPU_i(t)$ are calculated in the similar manner.

Then, the throughputs $TPS_j(t)$, $TPN_k(t)$ and $TPU_i(t)$ calculated in the above-mentioned way for each of the server, the network and the user terminal are stored in the server quality database 72, the network quality database 71 and the terminal quality database 73 of the quality database 70 respectively.

(3) Prediction of Communication Speed

Before start of new communication, when a communication speed information inquiry request is input, the communication speed predicting unit 30 performs processing for estimating a communication speed of the new communication in the following way based on throughput result information stored in the quality database 70.

That is, first, the syntax analysis unit 31 extracts a server ID and a user ID from the communication speed inquiry information request. Also, at the same time, the network ID conversion unit 32 refers to the network database 50 so as to convert the network information included in the communication speed information inquiry request into a network ID according to a network granularity used for estimation of a communication speed. Further, the calendar information conversion unit 33 refers to the calendar information database 60 so as to determine whether a communication date and time included in the communication speed information inquiry request is a holiday or a weekday, and convert the communication date and time into a time slot according to a time granularity used for estimation of the communication speed. Note that these conversion processes are the same as processes by the before-mentioned communication history analysis unit 10.

Next, the throughput predicting unit 34 reads, from the quality database 70, throughputs $TPS_j(t)$, $TPN_k(t)$, and $TPU_i(t)$ of the server, the network, and the user terminal in communications performed at the same time slot in the past respectively, based on the server ID and the user ID extracted from the syntax analysis unit 31, a value and ID converted by the network ID conversion unit 32, and the calendar information obtained by the calendar information conversion unit 33. Then, a communication speed of the new communication is predicted based on each piece of the read-out throughput information.

Equations used for the above-mentioned throughput calculation are exemplified in the following. That is, it is assumed that communication log information stored in the communication history database L is $L_m \in L$. Here, $L_m$ consists of $TI_m$ that is a value indicating date, day of week and time when communication was performed, $UI_m$ that is a value uniquely indicating a user, $SI_m$ that is a value uniquely indicating a server, $NI_m$ that is a value uniquely indicating a network that was used, and $TP_m$ that is a value indicating a throughput. Note that as a value uniquely indicating a network, as described before, IP address group that is compiled in units of ISP, or a base station ID of a mobile telephone circuit is used.

Here, a throughput $TP(i,t)$ that is expected when a user i intends to use a network service at a date and time t is obtained by $$TP(i,t)=\min(TPS_j(t),TPN_k(t),TPU_i(t)) \quad (2),$$

wherein j and k are identifiers of a server and a network that the user i intends to use. Note that $TP(i,t)$ may be represented as $TP(i,j,k,t)$.

That is, the minimum value of throughputs $TPS_j(t)$, $TPN_k(t)$, and $TPU_i(t)$ of the server, the network and the user terminal is selected. In the case where a value of $TPS_j(t)$, $TPN_k(t)$, and $TPU_i(t)$ is not obtained, the value is excluded so that calculation is performed only by throughputs of remaining elements.

Also, even when there are all values of $TPS_j(t)$, $TPN_k(t)$, and $TPU_i(t)$, any one value of $TPS_j(t)$, $TPN_k(t)$, and $TPU_i(t)$ may be determined as $TP(i,t)$, or a smaller one of any two values may be determined as $TP(i,t)$.

When the communication speed calculation unit 20 calculates a throughput, the communication speed calculation unit 20 calculates at least one of a ratio (percent value) of throughput values, included in upper and lower ranges each of which is predetermined, that are calculated for each of the server, the network and the user terminal for each time slot, and a deviation value of each of the calculated throughput values. Then, when estimating a communication speed expected for a new communication, the communication speed calculation unit 20 may estimate the communication speed of the new communication by selectively using the calculated throughput average value, the calculated upper percent value and the lower percent value, and the calculated deviation value of the throughput values.

More concrete example is described. For example, it is assumed that, at a time slot, the communication speed calculation unit 20 obtains 100 throughput values (corresponding to throughput average values shown in FIG. 7A and FIG. 7B) in total for a plurality of servers, a plurality of networks, and a plurality of user terminals. Also, it is assumed that a throughput value A is determined as an upper value, and a throughput value B is determined as a lower value. Then, a ratio of the number of values equal to or greater than the throughput value A in the 100 values, and a ratio of the number of values equal to or less than the throughput value B in the 100 values are calculated. Or, a dispersion value of the 100 values is calculated. Also, all of the ratio of the number of values equal to or greater than the throughput value A, the ratio of the number of values equal to or less than the throughput value B, and the dispersion value of the 100 values may be calculated.

As an example, it is assumed that a throughput $TP(i,t)$ that is expected for a user i at the time slot is obtained by the above-mentioned equation (2). Then, for example, when the ratio of the number of values equal to or greater than the throughput value A is greater than a predetermined value, adjustment is made to increase $TP(i,t)$ since large throughput can be expected at the time slot. Also, for example, when the ratio of the number of values equal to or less than the throughput value B is greater than a predetermined value, adjustment is made to decrease $TP(i,t)$ since the throughput is likely become small at the time slot. Also, for example, when the dispersion value is large, it can be predicted that network quality and the like varies widely at the time slot, so that adjustment is made to decrease $TP(i,t)$ considering safety.

The throughput $TP(i,j,k,t)$ calculated in the above-mentioned way is returned to a request source as estimation information of a communication speed expected in the new communication.

(Effects of Embodiment)

As described above in detail, in an embodiment, each time when communication is performed, the communication speed estimation apparatus stores, in the communication history database 40, information representing communication history, that is, for example, information identifying a user terminal, a server and a network used in the communication, and information representing a time slot including a communication time, and calculates throughput result information for each of the user terminal, the server and the network for each time slot of a predetermined granularity based on the communication log information and stored them in the quality database 70. Then, before a user starts new communication, the communication speed estimation apparatus searches the quality database 70 for throughput result information of communications performed in the same time slot in the past so as to estimate a communication speed of the new communication based on this throughput result information.

Therefore, when a user or a service provider intends to perform new communication, a communication speed is estimated by referring to throughput result information of each time slot performed by each of the server, the network and the user terminal that were used in communications under the past same condition. Therefore, an end-to-end communication speed can be estimated before starting communication.

Also, an average value of throughput values included in a predetermined upper range of a plurality of throughput values calculated for each of a same server, a same network and a same user terminal in a same time slot is calculated, so that the throughput average value is stored as throughput result information. That is, a method is adopted to obtain an upper quantile value for throughputs of communication log information of communication that uses the server, the network and the user terminal. According to this method, a lower value which may be rate-limited due to a factor other than the focusing factor can be removed, so that, even when there is dispersion in a plurality of communications performed under the same condition, more reliable estimation of a communication speed becomes possible by decreasing the effect of the dispersion.

Further, a smallest value is selected from among pieces of throughput result information calculated for each of the user terminal, the server and the network to estimate the communication speed. Therefore, it becomes possible to properly estimate an end-to-end communication speed in consideration of a property of network that end-to-end throughput in communication is rate-limited by one bottleneck.

(Summary of Embodiment)

According to an embodiment of the present invention, there is provided a communication speed estimation apparatus including:

first means configured to generate communication log information representing a history of communication executed by a user, and store the communication log information in a communication history information storage unit;

second means configured to calculate, based on the stored communication log information, throughput result information for each of a server, a network and a user terminal that were used for the communication for each time slot, and store the calculated throughput result information in a quality information storage unit, and third means configured, when the user performs new communication, in advance, to read out corresponding throughput result information from the quality information storage unit based on at least one of a terminal, a server and a network that the user intends to use, and a time slot including a time when the user intends to perform communication, and to estimate a communication speed in the new communication based on the read-out throughput result information.

The communication history unit 10 of the present embodiment is an example of the first means. The communication speed calculation unit 20 is an example of the second means. The communication speed predicting unit 30 is an example of the third means.

As described above, in the embodiment of the present invention, based on the stored communication log information representing a history of communication executed by the user, throughput result information is calculated for each of a server, a network and a user terminal that were used for the communication for each time slot, and stored. Then, when the user intends to perform new communication, in advance, throughput result information corresponding to at least one of a terminal, a server and a network that the user intends to use, and a time slot including a time when the user intends to perform communication is read out, so that a communication speed in the new communication is estimated. That is, when performing new communication, a communication speed is estimated by referring to throughput result information for each time slot by each of the server, the network and the terminal that were used in communication under the past same condition. Therefore, an end-to-end communication speed can be estimated more properly before performing communication.

That is, according to the present embodiment, a communication speed estimation apparatus, a method and a program that can estimate usable communication speed in advance can be provided.

[Other Embodiments]

The present invention is not limited to the above-mentioned embodiment. For example, the installation place of the communication speed estimation apparatus of the present invention may be any of a server in the service provider side, a user terminal, a server operated by a provider, and a server operated by a third party.

In addition, each configuration of the communication speed estimation apparatus, the communication history analysis unit, the communication speed calculation unit, and the communication speed predicting unit, format of communication log information, calculation processing procedure of throughputs and the process content, process procedure used for estimating communication speed and the process content and the like can be performed with variously modifications within a range without departing from the substance of the present invention.

In short, the present invention is not limited to the above-mentioned embodiment as it is, and can be substantiated by modifying components without departing from the substance when carrying out the invention. Also, various inventions can be formed by properly combining a plurality of components disclosed in the embodiment. For example, some components may be deleted from all components disclosed in the embodiment. Further, components of different embodiments may be properly combined.

The present patent application claims priority based on Japanese patent application No. 2014-256412, filed in the JPO on Dec. 18, 2014, and the entire contents of the Japanese patent application No. 2014-256412 are incorporated herein by reference.

DESCRIPTION OF REFERENCE SIGNS

1 . . . communication speed estimation apparatus
10 . . . communication history analysis unit
11, 31 . . . syntax analysis unit
12, 32 . . . network ID conversion unit
13, 33 . . . calendar information conversion unit
14 . . . log input unit
20 . . . communication speed calculation unit
21 . . . update determination unit
22 . . . speed update unit
30 . . . communication speed predicting unit
34 . . . throughput predicting unit
40 . . . communication history database
50 . . . network database
60 . . . calendar information database
70 . . . quality database
71 . . . network quality database
72 . . . server quality database
73 . . . terminal quality database
101 . . . CPU
102 . . . memory
103 . . . HDD
104 . . . input/output unit

The invention claimed is:

1. A communication speed estimation apparatus comprising:
processing circuitry configured to
generate communication log information representing a history of communication executed by a user, and store the communication log information in a communication history information memory;
calculate, based on the stored communication log information, throughput result information for each of a server, a network and a user terminal that were used for the communication for each time slot, and store the calculated throughput result information in a quality information memory, and
when the user performs new communication, in advance, read out a corresponding throughput result information from the quality information storage unit based on at least one of a terminal, a server and a network that the user intends to use, and a time slot including a time when the user intends to perform communication, and estimate a communication speed in the new communication based on the read-out throughput result information.

2. The communication speed estimation apparatus as claimed in claim 1, wherein, when a plurality of pieces of communication log information are stored in the communication history information memory, the processing circuitry is configured to aggregate communication log information of communications in which a same server, a same network or a same user terminal was used to calculate the throughput result information for each of the server, the network, and the user terminal for each time slot based on the aggregated communication log information.

3. The communication speed estimation apparatus as claimed in claim 2, wherein the processing circuitry is configured to calculate a throughput value for each of the server, the network, and the user terminal for each time slot, for each of the integrated pieces of communication log information, and to calculate an average of throughput values included in an predetermined upper range in each calculated throughput value, so as to regard the calculated throughput average value as the throughout result information.

4. The communication speed estimation apparatus as claimed in claim 1, wherein the processing circuitry is configured to read out, from the quality information memory, the calculated corresponding throughput result information corresponding to a time slot that includes a time when communication is intended to be performed, and corresponding to each of a terminal, a server, and a network that the user uses, to select one in which a throughput value is the smallest from among the read-out pieces of throughput result information, and to estimate a communication speed in the new communication based on the selected throughput result information.

5. The communication speed estimation apparatus as claimed in claim 4, wherein the processing circuitry is further configured to calculate at least one of a ratio of values included in upper and lower predetermined ranges of each throughput value calculated for each of the server, the network, and the user terminal for each time slot, and a value representing a degree of dispersion of each calculated throughput value, and estimate a communication speed in the new communication based on at least one of the calculated throughput average value, the calculated ratio of values included in the upper and lower predetermined ranges, and the calculated value representing the degree of dispersion of the throughput value.

6. A communication speed estimation method executed by a communication speed estimation apparatus including processing circuitry, comprising:

generating communication log information representing a history of communication executed by a user, and storing the communication log information in a communication history information memory;

calculating, based on the stored communication log information, throughput result information for each of a server, a network and a user terminal that were used for the communication for each time slot, and storing the calculated throughput result information in a quality information memory, and when the user performs new communication, in advance, reading out a corresponding throughput result information from the quality information memory based on at least one of a terminal, a server and a network that the user intends to use, and a time slot including a time when the user intends to perform communication, and estimating a communication speed in the new communication based on the read-out throughput result information.

7. A non-transitory computer readable medium that stores a program, which when executed, causes a communication speed estimation apparatus to perform a method comprising:

generating communication log information representing a history of communication executed by a user, and storing the communication log information in a communication history information memory;

calculating, based on the stored communication log information, throughput result information for each of a server, a network and a user terminal that were used for the communication for each time slot, and storing the calculated throughput result information in a quality information memory, and when the user performs new communication, in advance, reading out a corresponding throughput result information from the quality information memory based on at least one of a terminal, a server and a network that the user intends to use, and a time slot including a time when the user intends to perform communication, and estimating a communication speed in the new communication based on the read-out throughput result information.

* * * * *